(12) United States Patent
Silvernail et al.

(10) Patent No.: US 8,636,918 B2
(45) Date of Patent: Jan. 28, 2014

(54) CLEANING COMPOSITION CONTAINING A POLYSACCHARIDE HYBRID POLYMER COMPOSITION AND METHODS OF CONTROLLING HARD WATER SCALE

(75) Inventors: Carter Silvernail, Burnsville, MN (US); Erik C. Olson, Eagan, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 13/561,545

(22) Filed: Jul. 30, 2012

(65) Prior Publication Data

US 2013/0035274 A1    Feb. 7, 2013

Related U.S. Application Data

(63) Continuation-in-part of application No. 13/204,368, filed on Aug. 5, 2011, now abandoned.

(51) Int. Cl.
*C02F 5/10*      (2006.01)
*B08B 3/04*      (2006.01)
*C11D 7/36*      (2006.01)

(52) U.S. Cl.
USPC ........... 252/175; 510/247; 510/252; 510/267; 510/272; 510/339; 510/434; 510/435; 510/467; 510/470; 510/475; 510/505; 134/22.13; 134/22.14; 134/39; 134/41; 134/42

(58) Field of Classification Search
USPC ......... 510/247, 252, 267, 272, 339, 434, 435, 510/467, 470, 475, 505; 134/22.13, 22.14, 134/39, 41, 42; 252/175
See application file for complete search history.

(56) References Cited

U.S. PATENT DOCUMENTS

| | | |
|---|---|---|
| 2,536,658 A | 2/1951 | Rheineck |
| 2,798,053 A | 7/1957 | Brown |
| 2,954,347 A | 9/1960 | St. John et al. |
| 3,048,548 A | 8/1962 | Martin et al. |
| 3,308,067 A | 3/1967 | Diehl |
| 3,314,891 A | 4/1967 | Schmolka et al. |
| 3,334,147 A | 8/1967 | Brunelle et al. |
| 3,442,242 A | 5/1969 | Laskey et al. |
| 3,455,839 A | 7/1969 | Rauner |
| 3,518,176 A | 6/1970 | Reyes et al. |
| 3,629,121 A | 12/1971 | Eldib et al. |

(Continued)

FOREIGN PATENT DOCUMENTS

| | | |
|---|---|---|
| CA | 2074747 A1 | 2/1993 |
| DE | 4038908 A1 | 6/1992 |

(Continued)

OTHER PUBLICATIONS

International Search Report issued in PCT/US2012/049514 mailed Feb. 19, 2013, 3 pages.

(Continued)

*Primary Examiner* — Brian P Mruk
(74) *Attorney, Agent, or Firm* — Faegre Baker Daniels LLP

(57) ABSTRACT

A composition includes an anionic polysaccharide hybrid polymer composition and 2-phosphonobutane-1,2,4-tricarboxylic acid. In one embodiment, the polysaccharide hybrid polymer composition includes a polysaccharide residue present in an amount from approximately 5% to approximately 90% by weight of the polysaccharide hybrid polymer composition and a residue of at least one ethylenically unsaturated monomer present in an amount from approximately 10% to approximately 75% by weight of the polysaccharide hybrid polymer composition.

23 Claims, 1 Drawing Sheet

(56) References Cited

U.S. PATENT DOCUMENTS

| | | |
|---|---|---|
| 3,639,312 A | 2/1972 | Turner et al. |
| 3,673,148 A | 6/1972 | Vasta |
| 3,687,878 A | 8/1972 | Imoto et al. |
| 3,723,322 A | 3/1973 | Diehl |
| 3,803,285 A | 4/1974 | Jensen |
| 3,929,107 A | 12/1975 | Renger |
| 3,929,678 A | 12/1975 | Laughlin et al. |
| 3,933,672 A | 1/1976 | Bartolotta et al. |
| 4,048,122 A | 9/1977 | Sibley et al. |
| 4,133,779 A | 1/1979 | Hellyer et al. |
| 4,141,841 A | 2/1979 | McDanald |
| 4,228,042 A | 10/1980 | Letton |
| 4,239,660 A | 12/1980 | Kingry |
| 4,260,529 A | 4/1981 | Letton |
| 4,265,779 A | 5/1981 | Gandolfo et al. |
| 4,322,472 A | 3/1982 | Kaspar et al. |
| 4,374,035 A | 2/1983 | Bossu |
| 4,379,080 A | 4/1983 | Murphy |
| 4,388,205 A | 6/1983 | Stettler et al. |
| 4,412,934 A | 11/1983 | Chung et al. |
| 4,483,779 A | 11/1984 | Llenado et al. |
| 4,483,780 A | 11/1984 | Llenado |
| 4,521,578 A | 6/1985 | Chen et al. |
| 4,536,314 A | 8/1985 | Hardy et al. |
| 4,539,130 A | 9/1985 | Thompson et al. |
| 4,557,763 A | 12/1985 | George et al. |
| 4,565,647 A | 1/1986 | Llenado |
| 4,597,898 A | 7/1986 | Vander Meer |
| 4,605,721 A | 8/1986 | Jenkins et al. |
| 4,606,838 A | 8/1986 | Burns |
| 4,618,914 A | 10/1986 | Sato et al. |
| 4,634,551 A | 1/1987 | Burns et al. |
| 4,652,392 A | 3/1987 | Baginski et al. |
| 4,671,891 A | 6/1987 | Hartman |
| 4,681,592 A | 7/1987 | Hardy et al. |
| 4,681,695 A | 7/1987 | Divo |
| 4,681,704 A | 7/1987 | Bernardino et al. |
| 4,686,063 A | 8/1987 | Burns |
| 4,702,857 A | 10/1987 | Gosselink |
| 4,782,901 A | 11/1988 | Phelps et al. |
| 4,830,773 A | 5/1989 | Olson |
| 4,855,069 A | 8/1989 | Schuppiser et al. |
| 4,963,629 A | 10/1990 | Driemel et al. |
| 4,968,451 A | 11/1990 | Scheibel et al. |
| 5,032,659 A | 7/1991 | Heidel |
| 5,071,895 A | 12/1991 | Hughes et al. |
| 5,076,968 A | 12/1991 | Fringeli et al. |
| 5,121,795 A | 6/1992 | Ewert et al. |
| 5,125,455 A | 6/1992 | Harris et al. |
| 5,127,795 A | 7/1992 | Plemmons et al. |
| 5,223,171 A | 6/1993 | Jost et al. |
| 5,227,446 A | 7/1993 | Denzinger et al. |
| 5,248,449 A | 9/1993 | Mitchell et al. |
| 5,264,470 A | 11/1993 | Eoff |
| 5,304,620 A | 4/1994 | Holtmyer et al. |
| 5,326,864 A | 7/1994 | Besemer et al. |
| 5,332,528 A | 7/1994 | Pan et al. |
| 5,378,830 A | 1/1995 | Yeh |
| 5,385,959 A | 1/1995 | Tsaur et al. |
| 5,415,807 A | 5/1995 | Gosselink et al. |
| 5,435,935 A | 7/1995 | Kupneski |
| 5,478,503 A | 12/1995 | Swift |
| 5,500,154 A | 3/1996 | Bacon et al. |
| 5,501,815 A | 3/1996 | Man |
| 5,518,646 A | 5/1996 | Van den Brom |
| 5,518,657 A | 5/1996 | Fringeli et al. |
| 5,523,023 A | 6/1996 | Kleinstuck et al. |
| 5,543,459 A | 8/1996 | Hartmann et al. |
| 5,547,612 A | 8/1996 | Austin et al. |
| 5,565,145 A | 10/1996 | Watson et al. |
| 5,580,154 A | 12/1996 | Coulter et al. |
| 5,580,941 A | 12/1996 | Krause et al. |
| 5,583,193 A | 12/1996 | Aravindakshan et al. |
| 5,654,198 A | 8/1997 | Carrier et al. |
| 5,656,646 A | 8/1997 | Perner et al. |
| 5,658,651 A | 8/1997 | Smith et al. |
| 5,670,475 A | 9/1997 | Trinh et al. |
| 5,674,511 A | 10/1997 | Kacher et al. |
| 5,753,770 A | 5/1998 | Breitenbach et al. |
| 5,756,442 A | 5/1998 | Jeschke et al. |
| 5,760,154 A | 6/1998 | Krause et al. |
| 5,830,241 A | 11/1998 | Rohringer et al. |
| 5,852,069 A | 12/1998 | Meister et al. |
| 5,854,191 A | 12/1998 | Krause et al. |
| 5,854,321 A | 12/1998 | Krause et al. |
| 5,869,070 A | 2/1999 | Dixon et al. |
| 5,942,477 A | 8/1999 | Giret et al. |
| 5,942,479 A | 8/1999 | Frankenbach et al. |
| 5,942,485 A | 8/1999 | Kemen |
| 5,945,127 A | 8/1999 | Breitenbach et al. |
| 5,952,278 A | 9/1999 | Mao et al. |
| 5,977,275 A | 11/1999 | Rodrigues et al. |
| 5,985,809 A | 11/1999 | Frankenbach et al. |
| 5,990,065 A | 11/1999 | Vinson et al. |
| 6,004,922 A | 12/1999 | Watson et al. |
| 6,008,181 A | 12/1999 | Cripe et al. |
| 6,020,303 A | 2/2000 | Cripe et al. |
| 6,022,844 A | 2/2000 | Baillely et al. |
| 6,025,311 A | 2/2000 | Clarke et al. |
| 6,060,299 A | 5/2000 | Sreekrishna et al. |
| 6,060,443 A | 5/2000 | Cripe et al. |
| 6,060,582 A | 5/2000 | Hubbell et al. |
| 6,069,122 A | 5/2000 | Vinson et al. |
| 6,093,856 A | 7/2000 | Cripe et al. |
| 6,103,839 A | 8/2000 | Patel et al. |
| 6,106,849 A | 8/2000 | Malkan et al. |
| 6,130,194 A | 10/2000 | Pancheri et al. |
| 6,136,769 A | 10/2000 | Asano et al. |
| 6,143,707 A | 11/2000 | Trinh et al. |
| 6,150,322 A | 11/2000 | Singleton et al. |
| 6,153,570 A | 11/2000 | Decoster |
| 6,153,577 A | 11/2000 | Cripe et al. |
| 6,162,423 A | 12/2000 | Sebag et al. |
| 6,169,062 B1 | 1/2001 | Salager et al. |
| 6,221,825 B1 | 4/2001 | Williams, Jr. et al. |
| 6,225,462 B1 | 5/2001 | Berry et al. |
| 6,227,446 B1 | 5/2001 | Haney et al. |
| 6,231,650 B1 | 5/2001 | Mallow et al. |
| 6,258,765 B1 | 7/2001 | Wei et al. |
| 6,303,560 B1 | 10/2001 | Hartan et al. |
| 6,365,561 B1 | 4/2002 | Vinson et al. |
| 6,372,708 B1 | 4/2002 | Kasturi et al. |
| 6,376,438 B1 | 4/2002 | Rosenberger et al. |
| 6,384,132 B1 | 5/2002 | Horley et al. |
| 6,451,747 B1 | 9/2002 | Decoster |
| 6,482,994 B2 | 11/2002 | Scheper et al. |
| 6,528,477 B2 | 3/2003 | Kasturi et al. |
| 6,537,957 B1 | 3/2003 | Cardola et al. |
| 6,573,234 B1 | 6/2003 | Sivik et al. |
| 6,589,926 B1 | 7/2003 | Vinson et al. |
| 6,605,182 B1 | 8/2003 | Danner |
| 6,627,590 B1 | 9/2003 | Sherry et al. |
| 6,645,925 B2 | 11/2003 | Sivik et al. |
| 6,653,266 B2 | 11/2003 | Wei et al. |
| 6,656,900 B2 | 12/2003 | Sivik et al. |
| 6,764,992 B2 | 7/2004 | Kumar et al. |
| 6,800,712 B2 | 10/2004 | Doane et al. |
| 6,867,262 B1 | 3/2005 | Angel et al. |
| 6,908,955 B2 | 6/2005 | Porsch et al. |
| 6,911,053 B1 | 6/2005 | Bijsterbosch et al. |
| 7,012,048 B2 | 3/2006 | Drovetskaya et al. |
| 7,087,662 B2 | 8/2006 | Ghosh et al. |
| 7,151,079 B2 | 12/2006 | Fack et al. |
| 7,153,821 B2 | 12/2006 | Blokzijl et al. |
| 7,157,413 B2 | 1/2007 | Lazzeri et al. |
| 7,589,051 B2 | 9/2009 | Erazo-Majewicz et al. |
| 7,666,963 B2 | 2/2010 | Rodrigues et al. |
| 7,670,388 B2 | 3/2010 | Sugano et al. |
| 7,727,945 B2 | 6/2010 | Rodrigues et al. |
| 7,740,873 B2 | 6/2010 | Decoster et al. |
| 7,754,666 B2 | 7/2010 | Walters et al. |
| 8,227,381 B2 | 7/2012 | Rodrigues et al. |
| 2002/0016282 A1 | 2/2002 | Kumar et al. |
| 2002/0034487 A1 | 3/2002 | Maubru et al. |

(56) References Cited

U.S. PATENT DOCUMENTS

| | | |
|---|---|---|
| 2002/0055446 A1 | 5/2002 | Perron et al. |
| 2002/0106747 A1 | 8/2002 | Cheng et al. |
| 2002/0173592 A1 | 11/2002 | Saeki et al. |
| 2003/0008793 A1 | 1/2003 | Takiguchi et al. |
| 2003/0147827 A1 | 8/2003 | Decoster et al. |
| 2003/0147842 A1 | 8/2003 | Restle et al. |
| 2003/0211952 A1 | 11/2003 | Erazo-Majewicz et al. |
| 2004/0033929 A1 | 2/2004 | Bertleff et al. |
| 2004/0039137 A1 | 2/2004 | Heinemann et al. |
| 2004/0048760 A1 | 3/2004 | Rabon et al. |
| 2004/0067864 A1 | 4/2004 | Aubay et al. |
| 2004/0067865 A1 | 4/2004 | Harrison |
| 2004/0071742 A1 | 4/2004 | Popplewell et al. |
| 2004/0092425 A1 | 5/2004 | Boutique et al. |
| 2004/0102354 A1 | 5/2004 | Fack et al. |
| 2004/0103483 A1 | 6/2004 | Delplancke et al. |
| 2004/0107505 A1 | 6/2004 | Harrison et al. |
| 2004/0147425 A1 | 7/2004 | Castro et al. |
| 2004/0214736 A1 | 10/2004 | Modi |
| 2004/0266653 A1 | 12/2004 | Delplancke et al. |
| 2004/0266655 A1 | 12/2004 | Baum et al. |
| 2005/0019352 A1 | 1/2005 | Mercier et al. |
| 2005/0028293 A1 | 2/2005 | Geffroy |
| 2005/0108832 A1 | 5/2005 | Torri et al. |
| 2005/0143278 A1 | 6/2005 | Pegelow et al. |
| 2005/0171287 A1 | 8/2005 | Baum et al. |
| 2005/0176878 A1 | 8/2005 | Ettl et al. |
| 2005/0202985 A1 | 9/2005 | Nieendick et al. |
| 2005/0202989 A1 | 9/2005 | Wilson |
| 2005/0256027 A1 | 11/2005 | Heibel et al. |
| 2005/0267008 A1 | 12/2005 | Carvell et al. |
| 2005/0271595 A1 | 12/2005 | Brown |
| 2005/0276831 A1 | 12/2005 | Dihora et al. |
| 2006/0019847 A1 | 1/2006 | Fan et al. |
| 2006/0019858 A1 | 1/2006 | Kruse et al. |
| 2006/0024353 A1 | 2/2006 | Trouve et al. |
| 2006/0029561 A1 | 2/2006 | Gunn et al. |
| 2006/0106186 A1 | 5/2006 | Dupont et al. |
| 2006/0111511 A1 | 5/2006 | Narayan et al. |
| 2006/0182917 A1 | 8/2006 | Wood et al. |
| 2006/0183203 A1 | 8/2006 | DeAngelis |
| 2006/0183856 A1 | 8/2006 | Wood et al. |
| 2006/0183857 A1 | 8/2006 | Wood et al. |
| 2006/0252901 A1 | 11/2006 | Narayan et al. |
| 2006/0258555 A1 | 11/2006 | Filippini et al. |
| 2006/0258557 A1 | 11/2006 | Popplewell et al. |
| 2006/0281654 A1 | 12/2006 | Brooker et al. |
| 2007/0015678 A1 | 1/2007 | Rodrigues et al. |
| 2007/0021577 A1 | 1/2007 | Rodrigues et al. |
| 2007/0054816 A1 | 3/2007 | Berthier et al. |
| 2007/0111920 A1 | 5/2007 | Baur et al. |
| 2007/0138105 A1 | 6/2007 | Takeda et al. |
| 2007/0260046 A1 | 11/2007 | Tomita et al. |
| 2008/0020948 A1 | 1/2008 | Rodrigues et al. |
| 2008/0020961 A1* | 1/2008 | Rodrigues et al. ............ 510/475 |
| 2008/0021167 A1 | 1/2008 | Rodrigues |
| 2008/0021168 A1 | 1/2008 | Rodrigues et al. |
| 2008/0118568 A1 | 5/2008 | Smets et al. |
| 2008/0139441 A1 | 6/2008 | Xiao et al. |
| 2008/0146478 A1 | 6/2008 | Lei et al. |
| 2008/0230193 A1 | 9/2008 | Mori et al. |
| 2008/0274940 A1 | 11/2008 | Tjelta et al. |
| 2008/0274942 A1 | 11/2008 | Tjelta et al. |
| 2008/0277620 A1 | 11/2008 | Kesavan et al. |
| 2008/0305982 A1 | 12/2008 | Smets et al. |
| 2008/0311064 A1 | 12/2008 | Lei et al. |
| 2009/0011973 A1 | 1/2009 | Besse et al. |
| 2009/0023625 A1 | 1/2009 | Tang et al. |
| 2009/0062175 A1 | 3/2009 | Cermenati et al. |
| 2009/0087390 A1 | 4/2009 | Modi |
| 2009/0176687 A1 | 7/2009 | Tjelta et al. |
| 2009/0258042 A1 | 10/2009 | Anastasiou et al. |
| 2009/0258810 A1 | 10/2009 | Song et al. |
| 2010/0008870 A1 | 1/2010 | Dihora et al. |
| 2010/0056413 A1 | 3/2010 | Harry, Jr. et al. |
| 2010/0069280 A1 | 3/2010 | Rodrigues et al. |
| 2010/0075879 A1 | 3/2010 | Gizaw et al. |
| 2010/0075880 A1 | 3/2010 | Dupont et al. |
| 2010/0075887 A1 | 3/2010 | Wang et al. |
| 2010/0086575 A1 | 4/2010 | Dihora et al. |
| 2010/0093584 A1 | 4/2010 | Brand et al. |
| 2010/0154831 A1 | 6/2010 | Neplenbroek et al. |
| 2010/0167547 A1* | 7/2010 | Kamimura ................... 438/693 |
| 2010/0236736 A1 | 9/2010 | Brockmeyer et al. |
| 2010/0280146 A1 | 11/2010 | Vanderlaan et al. |
| 2010/0317560 A1 | 12/2010 | Ryther et al. |
| 2011/0017945 A1 | 1/2011 | Miralles et al. |
| 2011/0021410 A1 | 1/2011 | Miralles et al. |
| 2011/0021734 A1 | 1/2011 | Samaranayake et al. |
| 2011/0028371 A1 | 2/2011 | Rodrigues et al. |
| 2011/0118168 A1 | 5/2011 | Schunicht et al. |
| 2011/0136718 A1 | 6/2011 | Rodrigues et al. |
| 2012/0128608 A1 | 5/2012 | Rodrigues et al. |
| 2012/0134942 A1 | 5/2012 | Thomaides et al. |
| 2013/0035273 A1 | 2/2013 | Silvernail et al. |
| 2013/0035275 A1 | 2/2013 | Silvernail et al. |
| 2013/0035276 A1 | 2/2013 | Silvernail et al. |
| 2013/0035277 A1 | 2/2013 | Silvernail et al. |

FOREIGN PATENT DOCUMENTS

| | | |
|---|---|---|
| EP | 0130756 B1 | 1/1985 |
| EP | 0130759 B1 | 1/1985 |
| EP | 0438215 A1 | 7/1991 |
| EP | 0441197 B1 | 8/1991 |
| EP | 0577519 B1 | 1/1994 |
| EP | 0605084 A1 | 7/1994 |
| EP | 0505371 B1 | 3/1996 |
| EP | 0725131 A1 | 8/1996 |
| EP | 0526800 B1 | 1/1997 |
| EP | 0869169 A1 | 10/1998 |
| EP | 0653485 B1 | 5/2000 |
| EP | 0797656 B1 | 5/2000 |
| EP | 0703243 B1 | 12/2000 |
| EP | 0628655 B1 | 5/2001 |
| EP | 1043389 B1 | 5/2001 |
| EP | 1043388 B1 | 12/2001 |
| EP | 1021156 B1 | 2/2002 |
| EP | 1162257 B1 | 2/2006 |
| EP | 1520004 B1 | 12/2006 |
| EP | 1506765 B1 | 7/2007 |
| EP | 1881017 A2 | 1/2008 |
| EP | 1997874 A1 | 3/2008 |
| EP | 1950232 A1 | 7/2008 |
| EP | 1699429 B1 | 10/2008 |
| EP | 2014757 A1 | 1/2009 |
| EP | 1741775 B1 | 4/2009 |
| EP | 2072531 A1 | 6/2009 |
| EP | 2138560 B1 | 12/2009 |
| EP | 1877171 B1 | 3/2010 |
| EP | 2164940 A2 | 3/2010 |
| EP | 2176393 A1 | 4/2010 |
| FR | 2856073 A1 | 12/2004 |
| FR | 2908135 A1 | 5/2008 |
| FR | 2927083 A1 | 8/2009 |
| GB | 1322536 A | 12/1929 |
| GB | 1355998 A | 9/1931 |
| GB | 1464616 A | 4/1937 |
| GB | 2322137 A | 8/1998 |
| GB | 2432844 A | 6/2007 |
| GB | 2432852 A | 6/2007 |
| JP | 57082145 A | 5/1982 |
| JP | 6157253 A | 6/1994 |
| JP | 6298866 A | 10/1994 |
| JP | 9249892 A | 9/1997 |
| JP | 113343449 A | 12/1999 |
| JP | 2000017299 A | 1/2000 |
| JP | 2002285019 A | 10/2002 |
| JP | 2005120045 A | 5/2005 |
| JP | 2008208051 A | 9/2008 |
| JP | 2010047713 A | 3/2010 |
| JP | 2011195809 A1 | 10/2011 |
| WO | WO9006125 A1 | 6/1990 |
| WO | WO9106637 A1 | 5/1991 |

(56) References Cited

FOREIGN PATENT DOCUMENTS

| | | |
|---|---|---|
| WO | WO9206162 A1 | 4/1992 |
| WO | WO9210433 A1 | 6/1992 |
| WO | WO9311214 A1 | 6/1993 |
| WO | WO9319038 A1 | 9/1993 |
| WO | WO9319146 A1 | 9/1993 |
| WO | WO9409099 A1 | 4/1994 |
| WO | WO9510591 A1 | 4/1995 |
| WO | WO9526393 A1 | 10/1995 |
| WO | WO9526710 A1 | 10/1995 |
| WO | WO9635645 A1 | 11/1996 |
| WO | WO9637530 A1 | 11/1996 |
| WO | WO9745510 A1 | 12/1997 |
| WO | WO9818352 A1 | 5/1998 |
| WO | WO9835002 A1 | 8/1998 |
| WO | WO9835003 A1 | 8/1998 |
| WO | WO9835004 A1 | 8/1998 |
| WO | WO9835005 A1 | 8/1998 |
| WO | WO9835006 A1 | 8/1998 |
| WO | WO9849260 A1 | 11/1998 |
| WO | WO9902663 A1 | 1/1999 |
| WO | WO9905082 A1 | 2/1999 |
| WO | WO9905084 A1 | 2/1999 |
| WO | WO9905241 A1 | 2/1999 |
| WO | WO9905242 A1 | 2/1999 |
| WO | WO9905243 A1 | 2/1999 |
| WO | WO9905244 A1 | 2/1999 |
| WO | WO9907656 A2 | 2/1999 |
| WO | WO9920726 A1 | 4/1999 |
| WO | WO9927083 A1 | 6/1999 |
| WO | WO9936470 A1 | 7/1999 |
| WO | WO0012661 A1 | 3/2000 |
| WO | WO0015180 A1 | 3/2000 |
| WO | WO0018868 A1 | 4/2000 |
| WO | WO0020470 A2 | 4/2000 |
| WO | WO0023548 A1 | 4/2000 |
| WO | WO0023549 A1 | 4/2000 |
| WO | WO0036076 A1 | 6/2000 |
| WO | WO0047708 A1 | 8/2000 |
| WO | WO0124779 A1 | 4/2001 |
| WO | WO0132816 A1 | 5/2001 |
| WO | WO0142408 A2 | 6/2001 |
| WO | WO0238715 A2 | 5/2002 |
| WO | WO0244686 A2 | 6/2002 |
| WO | WO03042262 A2 | 5/2003 |
| WO | WO03095597 A1 | 11/2003 |
| WO | WO2004046301 A1 | 6/2004 |
| WO | WO2004048418 A2 | 6/2004 |
| WO | WO2005009023 A1 | 6/2005 |
| WO | WO2005051343 A1 | 6/2005 |
| WO | WO2005068552 A1 | 7/2005 |
| WO | WO2006002565 A1 | 1/2006 |
| WO | WO2006007945 A1 | 1/2006 |
| WO | WO2006119162 A1 | 11/2006 |
| WO | WO2007140267 A1 | 12/2007 |
| WO | WO2008144744 A2 | 11/2008 |
| WO | WO2008147940 A2 | 12/2008 |
| WO | WO2009006603 A1 | 1/2009 |
| WO | WO2009087525 A1 | 7/2009 |
| WO | WO2009156233 A1 | 12/2009 |
| WO | WO2010057977 A1 | 5/2010 |
| WO | WO2010065482 A1 | 6/2010 |
| WO | WO2010065483 A1 | 6/2010 |
| WO | WO2010079466 A2 | 7/2010 |
| WO | WO2010079467 A2 | 7/2010 |
| WO | WO2011014783 A1 | 2/2011 |
| WO | WO2011025624 A1 | 3/2011 |

OTHER PUBLICATIONS

International Search Report issued in PCT/US2012/049547 mailed Jan. 23, 2013, 4 pages.
International Search Report issued in PCT/US2012/049564 mailed Jan. 23, 2013, 4 pages.
International Search Report issued in PCT/US2012/049584 mailed Jan. 21, 2013, 4 pages.
International Search Report issued in PCT/US2012/049595 mailed Feb. 25, 2013, 3 pages.
Pal, S. et al., "Cationic startch: an effective flocculating agent", Carbohydrate Polymers, vol. 59, 2005, pp. 417-423.
Dubois, Michel et al., "Colorimetric Method for Determination of Sugars and Related Substances", Analytical Chemistry, vol. 28, No. 3, Mar. 1956, pp. 350-356.
European Search Report issued in EP Application No. 06015025, completed Nov. 13, 2006, 9 pages.
European Search Report issued in EP Application No. 07014412, completed Jan. 23, 2008, 2 pages.
European Search Report issued in EP Application No. 07014412, completed Oct. 18, 2007, 3 pages.
European Search Report issued in EP Application No. 07014413, completed Nov. 6, 2007, 12 pages.
European Search Report issued in EP Application No. 09175465, completed Jan. 14, 2010, 6 pages.
Herman, Mark F., Encyclopedia of Polymer Science and Technology, vol. 11, Copyright 2004 John Wiley & Sons, Inc., p. 380.
International Search Report and Written Opinion issued in International Application No. PCT/US2012/049547, mailed Jan. 23, 2013, 11 pages.
International Search Report and Written Opinion issued in PCT/US2010/043919, mailed Sep. 30, 2010, 13 pages.
International Search Report and Written Opinion issued in PCT/US2010/043930, mailed Dec. 14, 2010, 16 pages.
International Search Report and Written Opinion issued in PCT/US2012/049564, mailed Jan. 23, 2013, 10 pages.
International Search Report and Written Opinion issued in PCT/US2012/049584, mailed Jan. 21, 2013, 11 pages.
International Search Report and Written Opinion issued in PCT/US2012/049595, mailed Feb. 25, 2013, 10 pages.
International Search Report and Written Opinion issued in PCT/US2012/049608, mailed Mar. 22, 2013, 13 pages.
Kahya, Suat et al., "A Novel Copolymer: Starch-g-Polyvinylpyrrolidone", Starch, vol. 61, 2009, pp. 267-274.
Kirk-Othmer Encyclopedia of Chemical Technology, 3rd Edition, vol. 7, Copyright 1979 John Wiley & Sons, pp. 430-447.
Kroschwitz, Jacqueline I., "Concise Encyclopedia of Polymer Science and Engineering", Copyright 1990 by John Wiley & Sons, Inc., p. 436.
Kwei, Kwei-Ping S. et al., "Chain Transfer Constant of vinylpyrrolidone With Dextran", Institute of Polymer Research, vol. 66, May 1962, pp. 828-829.
Menger, F.M. et al., "Gemini Surfactants: A New Class of Self-Assembling Molecules", J. Am. Chem. Soc., 1993, vol. 115, pp. 10083-10090.
Odian, George, "Principles of Polymerization", 2nd Edition, Copyright 1981 John Wiley & Sons, Inc., p. 226.
Odian, George, "Principles of Polymerization", copyright 1970 McGraw-Hill, Inc., p. 424.
Rosen, Milton J., "Geminis: A New Generation of Surfactants", Chemtech, Mar. 1993, pp. 30-33.
Shen, K.P. et al., "Graft Copolymers of Vinyl Pyrrolidone on Dextran", Journal of Polymer Science, vol. 53, 1961, pp. 81-85.
Wurzburg, O.B., "Modified Starches: Properties and Uses", Chapter 10 Grafted Starches, Copyright 1986 CRC Press, Inc., pp. 149-172.

* cited by examiner

|   |   |   |   |   | G |
|---|---|---|---|---|---|
|   |   |   |   | G |   |
|   |   |   | G |   |   |
|   |   | G |   |   |   |
|   | G |   |   | P |   |
| G |   |   |   |   |   |

CLEANING COMPOSITION CONTAINING A POLYSACCHARIDE HYBRID POLYMER COMPOSITION AND METHODS OF CONTROLLING HARD WATER SCALE

CROSS REFERENCE TO RELATED APPLICATIONS

This application is a continuation in part application of U.S. application Ser. No. 13/204,368 that was filed with the United States Patent and Trademark Office on Aug. 5, 2011, now abandoned, which application is incorporated by reference in its entirety herein.

TECHNICAL FIELD

The present invention is related to the field of hard water scale control. In particular, the present invention is related to a cleaning composition including a polysaccharide hybrid polymer composition and 2-phosphonobutane-1,2,4-tricarboxylic acid or salts thereof for hard water scale control, particularly in a high alkaline environment.

BACKGROUND

Conventional detergents used in food and beverage (e.g., the dairy, cheese, sugar, meat, food, and brewery and other beverage industries), warewashing and laundry industries include alkaline detergents. Alkaline detergents, particularly those intended for institutional and commercial use, generally contain phosphates, nitrilotriacetic acid (NTA) and ethylenediaminetetraacetic acid (EDTA). Phosphates, NTA and EDTA are components commonly used in detergents to remove soils and to sequester metal ions such as calcium, magnesium and iron.

In particular, NTA, EDTA or polyphosphates such as sodium tripolyphosphate and their salts are used in detergents because of their ability to solubilize preexisting inorganic salts and/or soils. When calcium, magnesium and iron salts precipitate, the crystals may attach to the surface being cleaned and cause undesirable effects. For example, calcium carbonate precipitation on the surface of ware can negatively impact the aesthetic appearance of the ware, giving an unclean look. In the laundering area, if calcium carbonate precipitates and attaches onto the surface of fabric, the crystals may leave the fabric feeling hard and rough to the touch. In the food and beverage industry, the calcium carbonate residue can affect the acidity levels of foods. The ability of NTA, EDTA and polyphosphates to remove metal ions facilitates the detergency of the solution by preventing hardness precipitation, assisting in soil removal and/or preventing soil redeposition into the wash solution or wash water.

While effective, phosphates and NTA are subject to government regulations due to environmental and health concerns. Although EDTA is not currently regulated, it is believed that government regulations may be implemented due to environmental persistence. Therefore, there is a need in the art for an alternative, and preferably environment friendly, cleaning composition that can replace the properties of phosphorous-containing compounds such as phosphates, phosphonates, phosphites, and acrylic phosphinate polymers, as well as non-biodegradable aminocarboxylates such as NTA and EDTA.

SUMMARY

The present invention includes a cleaning composition for controlling hard water scale accumulation. The composition includes a polysaccharide hybrid polymer composition and 2-phosphonobutane-1,2,4-tricarboxylic acid. In some embodiments, the polysaccharide hybrid polymer composition includes a polysaccharide residue present in an amount from about 5% to about 90% by weight of the polysaccharide hybrid polymer composition and a residue of at least one ethylenically unsaturated monomer present in an amount from about 10% to about 75% by weight of the polysaccharide hybrid polymer composition.

In other embodiments, the cleaning composition is used by mixing water with the composition to form a use solution. The water and composition can be mixed so that the use solution has a polysaccharide hybrid polymer composition concentration from about 1 part-per-million (ppm) to about 500 ppm.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 1 is a diagram related to a 100 cycle warewashing test.

DETAILED DESCRIPTION

The present cleaning compositions include a polysaccharide hybrid polymer composition and 2-phosphonobutane-1,2,4-tricarboxylic acid or salts thereof (PBTC). Such compositions may be useful in controlling hard water scale, particularly in water treatment applications and in high alkaline environments. Further, such compositions can be biodegradable and substantially free of phosphorous containing components to comply with various regulatory requirements.

The present compositions can be used in any environment in which it is desirable to control hard water scale and to remove or prevent redeposition of soil, such as protein, on surfaces such as but not limited to plastic, glass, ceramic and metal. Example applications include warewashing, laundering, institutional, health care, food and beverage, and water treatment applications. More particularly, example applications include, but are not limited to: machine and manual warewashing, presoaks, laundry and textile cleaning and destaining, carpet cleaning and destaining, surface cleaning and destaining, kitchen and bath cleaning and destaining, floor cleaning and destaining, cleaning in place operations, general purpose cleaning and destaining, industrial or household cleaners, and industrial or municipal water systems. The present compositions may also be used as textile scours, mineral deposition, or in oilfield applications, such as for scale inhibition or drilling aids. Methods of using the composition are also provided.

The cleaning compositions generally include a polysaccharide hybrid polymer composition, and 2-phosphonobutane-1,2,4-tricarboxylic acid or salts thereof (PBTC). Suitable weight ratios of polysaccharide hybrid polymer composition to PBTC are from about 15:1 to about 1:15. Particularly suitable weight ratios of polysaccharide hybrid polymer composition to PBTC are from about 10:1 to about 1:10. In an embodiment, the polysaccharide hybrid polymer composition is anionic polysaccharide hybrid polymer composition. In another embodiment, the polysaccharide hybrid polymer composition is a copolymer.

The polysaccharide hybrid polymer compositions of the present invention are produced by polymerizing with free radical initiators at least one ethylenically unsaturated monomer in the presence of the polysaccharide as a chain transfer agent, such as described in U.S. Pat. No. 7,666,963 and PCT Publication No. WO 2011/014783, each of which is incorporated by reference in its entirety herein. The polymerization is initiated by a non-metal or a non-metal ion initiator, such as inorganic peroxides including, but not limited to, hydrogen peroxide, sodium persulfate, potassium persulfate and ammonium persulfate.

As described herein, a "hybrid polymer composition" is a mixture of (a) a hybrid synthetic polymer and (b) a hybrid polymer. The hybrid polymer compositions of the present invention thus contain at least the two moieties, (a) and (b), with a minimum amount of the hybrid synthetic polymer (a) since this component generates the chain transfer which leads to the formation of the hybrid polymer (b). One skilled in the art will recognize that the hybrid polymer composition may contain a certain amount of the unreacted naturally derived hydroxyl containing chain transfer agent. Suitable hybrid polymer compositions are described in PCT Publication No. WO 2011/014783. The term "hybrid polymer", as defined herein, refers to a polymer of ethylenically unsaturated monomers with an end group containing the naturally derived hydroxyl containing chain transfer agent which is a result of the hybrid synthetic polymer chain transfer. Also as used herein, the term "hybrid synthetic polymer" is a synthetic polymer derived from synthetic monomers with a hybrid initiator fragment as one end group. The other end group is a proton resulting from chain transfer to the naturally derived hydroxyl containing chain transfer agent. As used herein, the term "synthetic monomer" means any ethylenically unsaturated monomer which can undergo free radical polymerization. In some embodiments, the hybrid polymer composition suitable for use in this invention is an anionic hybrid polymer or copolymer composition.

Polymerization may change a component from its original structure to a derivative structure. As used herein, the term "residue" refers to the starting component or anything derived from the component during polymerization which is part of the polymer. For example, a residue of acrylic acid includes acrylic acid and anything derived from acrylic acid during polymerization which is part of the polymer or resulting polymer composition. In one example, the polysaccharide hybrid polymer composition can have a weight average molecular weight from about 2,000 g/mol to about 25,000 g/mol. In another embodiment, the polysaccharide hybrid polymer composition has a weight average molecular weight from about 5,000 g/mol to about 20,000 g/mol and in yet another embodiments from about 7,000 to about 15,000 g/mol. The weight average molecular weight may be determined by several methods, with Gel Permeation Chromotagraphy (GPC) using the appropriate methods and standards as the preferred method.

The residue of a polysaccharide includes a polysaccharide and anything derived from the polysaccharide during polymerization which is part of the polysaccharide hybrid polymer. Suitable polysaccharides can be derived from plant, animal and microbial sources. Example polysaccharides include but are not limited to maltodextrins, starches, cellulose, gums (e.g., gum arabic, guar and xanthan), alginates, pectin and gellan. Suitable starches include those derived from maize, potato, tapioca, wheat, rice, pea, sago, oat, barley, rye, and amaranth, including conventional hybrids or genetically engineered materials. Additional example polysaccharides include hemicellulose or plant cell wall polysaccharides such as D-xylans.

The polysaccharides can be modified or derivatized by etherification (e.g., via treatment with propylene oxide, ethylene oxide, 2,3-epoxypropyltrimethylammonium chloride), esterification (e.g., via reaction with acetic anhydride, octenyl succinic anhydride ('OSA')), acid hydrolysis, dextrinization, oxidation or enzyme treatment (e.g., starch modified with α-amylase, β-amylase, pullanase, isoamylase or glucoamylase), or various combinations of these treatments.

The polysaccharide hybrid polymer composition also includes residue of at least one ethylenically unsaturated monomer. In some embodiments, the at least one ethylenically unsaturated monomer is an anionic ethylenically unsaturated monomer. Examples of anionic ethylenically unsaturated monomers include but are not limited to acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, 2-acryloxypropionic acid, 2-acrylamido-2-methyl propane sulfonic acid, vinyl sulfonic acid, sodium methallyl sulfonate, sulfonated styrene, allyloxybenzene sulfonic acid and maleic acid. The anionic ethylenically unsaturated monomers may include half esters of maleic and itaconic acid such as monomethyl, monoethyl, monopropyl, monobutyl, monoisopropyl and monotertbutyl maleate, and monomethyl, monoethyl, monopropyl, monobutyl, monoisopropyl and monotertbutyl itaconate. Moieties such as maleic anhydride or acrylamide that can be derivatized to an acid containing group can be used. Combinations of anionic ethylenically unsaturated monomers can also be used. In an embodiment, the anionic ethylenically unsaturated monomers include acrylic acid, maleic acid, methacrylic acid, 2-acrylamido-2-methyl propane sulfonic acid, monomethyl maleate and/or mixtures thereof or their salts. In another embodiment, the acid-containing monomers are acrylic acid and/or methacrylic acid. As an example, the anionic polysaccharide hybrid polymer composition includes acrylic acid residue. The residue of acrylic and methacrylic acid may be derived from acrylic and methacrylic acid monomers or may be generated from a hydrolyzable monomer. For example, a methacrylic acid residue may be partially or completely hydrolyzed from methyl methacrylate. The residues of acrylic acid and methacrylic acid may also be present as lithium, sodium, and potassium salts, ammonium and amine salts.

The polysaccharide hybrid polymer composition may optionally include residue of other ethylenically unsaturated monomers. In an embodiment, such other ethylenically unsaturated monomers are hydrophilic. Examples of other ethylenically unsaturated monomers include but are not limited to hydroxyalkyl(meth)acrylate or dialkyl maleate or dialkyl itaconate. A residue of hydroxyalkyl(meth)acrylate includes both hydroxyalkyl acrylate and hydroxyalkyl methacrylate. Examples of suitable hydroxyalkyl(meth)acrylates include but are not limited to hydroxymethyl, hydroxyethyl, hydroxypropyl, hydroxybutyl, hydroxyisopropyl and hydroxytertbutyl(meth)acrylates. Suitable dialkyl maleates include but are not limited to diethyl, dipropyl, dibutyl, diisopropyl and ditertbutyl maleate. Suitable dialkyl itaconates include but are not limited monomethyl, monoethyl, monopropyl, monobutyl, monoisopropyl and monotertbutyl itaconate. The polysaccharide hybrid polymer composition may optionally include residue of more than one ethylenically unsaturated monomer. In an embodiment, the polysaccharide hybrid polymer composition includes residue of two ethylenically unsaturated monomers present in the polysaccharide hybrid polymer composition in weight ratios from about 1:5 to about 5:1. In a preferred embodiment, acrylic acid and maleic acid are present in the polysaccharide hybrid polymer composition in weight ratios from about 1:5 to about 5:1.

A suitable concentration range of the components in the polysaccharide hybrid polymer composition include from about 5% to about 90% by weight polysaccharide residue and from about 10% to about 75% by weight residue of at least one ethylenically unsaturated monomer. In another embodiment, the polysaccharide hybrid polymer composition include from about 30% to about 80% by weight polysaccharide residue. A particularly suitable concentration range of the components in the polysaccharide hybrid polymer composition includes from about 40% to about 70% by weight polysaccharide residue and from about 5% to about 50% by weight residue of the at least one ethylenically unsaturated monomer. The component weight percentages of the polysaccharide hybrid polymer composition given above and in the examples are based on the amounts of the respective ingredients as originally added to the polysaccharide hybrid polymer composition. One skilled in the art will recognize that the weight percent of each component in the final polysaccharide hybrid polymer composition may vary due to the polymerization process.

The composition also includes phosphonobutane-1,2,4-tricarboxylic acid or salts thereof (PBTC). Suitable commercially available PBTC include Bayhibit S a 2-phosphobutane-1,2,4-tricarboxylic acid tetrasodium salt available from Lanxess, Pittsburgh, Pa. The combination of polysaccharide hybrid polymer composition and PBTC may effectively control hard water scale accumulation.

In another embodiment the composition is a detergent composition that generally includes an alkali metal hydroxide, water, a polysaccharide hybrid polymer composition, and 2-phosphonobutane-1,2,4-tricarboxylic acid or salts thereof (PBTC). The detergent composition, for example, may be particularly suitable for removing soil from a substrate, preventing soil redeposition and controlling hard water scale. A suitable concentration range of the components in a concentrated form of the detergent compositions include from about 1% to about 80% by weight alkali metal hydroxide, from about 1% to about 40% by weight of water, from about 0.1% to about 15% by weight of the polysaccharide hybrid polymer composition, and from about 0.01% to about 10% by weight of PBTC. A particularly suitable concentration range of the components in the detergent compositions include from about 20% to about 70% by weight alkali metal hydroxide, from about 5% to about 30% by weight of water, from about 1% to about 10% by weight of the polysaccharide hybrid polymer composition, and from about 0.5% to about 10% by weight of PBTC.

Suitable alkali metal hydroxides include but are not limited to: sodium hydroxide, potassium hydroxide, lithium hydroxide, and combinations thereof. The alkali metal hydroxide may be added to the composition in any form known in the art, including as solid beads, dissolved in an aqueous solution, or a combination thereof. Additionally, more than one alkalinity source may be used according to certain embodiments.

The alkali metal hydroxide controls the pH of the resulting solution when water is added to the detergent composition to form a use solution. The pH of the use solution must be maintained in the alkaline range in order to provide sufficient detergency properties. In one embodiment, the pH of the use solution is from approximately 9 to approximately 13. Particularly, the pH of the use solution is from about 10 to about 12. If the pH of the use solution is too high, for example, above about 13, the use solution may be too alkaline and attack or damage the surface to be cleaned.

The alkali metal hydroxide may also function as a hydratable salt to form a solid composition. The hydratable salt can be referred to as substantially anhydrous. By substantially anhydrous, it is meant that the component contains less than about 2% by weight water based upon the weight of the hydratable component. The amount of water can be less than about 1% by weight, and can be less than about 0.5% by weight. There is no requirement that the hydratable salt be completely anhydrous.

The detergent composition also includes water of hydration to hydrate the alkali metal hydroxide/hydratable salt. It should be understood that the reference to water includes both water of hydration and free water. The phrase "water of hydration" refers to water which is somehow attractively bound to a non-water molecule. An exemplary form of attraction includes hydrogen bonding. The water of hydration also functions to increase the viscosity of the mixture during processing and cooling to prevent separation of the components. The amount of water of hydration in the detergent composition will depend on the alkali metal hydroxide/hydratable salt. In addition to water of hydration, the detergent composition may also have free water which isn't attractively bound to a non-water molecule.

The detergent composition also includes a polysaccharide hybrid polymer composition and PBTC. As discussed above, the polysaccharide hybrid polymer composition and PBTC combination may be particularly helpful in controlling hard water scale. A suitable concentration of the of the polysaccharide hybrid polymer composition and PBTC combination in the detergent compositions is from about 0.5% to about 25% by weight of the detergent composition. A particularly suitable concentration of the polysaccharide hybrid polymer composition and PBTC combination in the detergent compositions is from about 1% to about 15% by weight of the detergent composition.

The polysaccharide hybrid polymer composition can be a bio-based and/or biodegradable polymer, which reduces the reliance on natural gas and/or petrochemical feedstocks. Biobased content is the amount of biobased carbon in a material or product and can be expressed as a percent of weight (mass) of the total organic carbon in the product. The biobased content can be determined using ASTM Method D6866, entitled Standard Test Methods for Determining the Biobased Content of Natural Range Materials Using Radiocarbon and Isotrope Ratio Mass Spectrometry Analysis, Biodegradability measures the ability of microorganisms present in the disposal environment to completely consume the biobased carbon product within a reasonable time frame and in a specified environment. In one example, the polysaccharide hybrid polymer composition can include a polysaccharide and a reduced level of petrochemicals. For example, the detergent composition may include at least about 10 wt % biodegradable content. In another example, the detergent composition may include from about 10 wt % o about 80 wt % biodegradable content by weight.

The detergent compositions of the present invention can be provided in any of a variety of embodiments of detergent compositions. In an embodiment, the detergent composition is substantially free of phosphorous, nitrilotriacetic acid (NTA) and ethylenediaminetetraacetic acid (EDTA). Phosphorus-free means a composition having less than approximately 0.5 wt %, more particularly, less than approximately 0.1 wt %, and even more particularly less than approximately 0.01 wt % phosphorous based on the total weight of the composition. NTA-free means a composition having less than approximately 0.5 wt %, less than approximately 0.1 wt %, and particularly less than approximately 0.01 wt % NTA based on the total weight of the composition. When the composition is NTA-free, it is also compatible with chlorine, which functions as an anti-redeposition and stain-removal agent. When diluted to a use solution, the detergent composition includes phosphorous-containing components, NTA and EDTA concentrations of less than approximately 100 ppm, particularly less than approximately 10 ppm, and more particularly less than approximately 1 ppm.

Additional Functional Materials

The composition can also include various additional functional components. In some embodiments, the polysaccharide hybrid polymer composition and PBTC make up a large amount, or even substantially all of the total weight of the detergent composition, for example, in embodiments having few or no additional functional materials disposed therein. In one specific example, the composition consists essentially of the polysaccharide hybrid polymer composition and PBTC. In these embodiments, the component concentration ranges provided above for the detergent are representative of the ranges of those same components in the detergent composition.

In other embodiments, the alkali metal hydroxide, water, 2-phosphonabutane-1,2,4-tricarboxylic acid or salts thereof, and the polysaccharide hybrid polymer composition make up a large amount, or even substantially all of the total weight of the composition, for example, in embodiments having few or no additional functional materials disposed therein. In one specific example, the composition consists essentially of the alkali metal hydroxide, water, 2-phosphonobutane-1,2,4-tricarboxylic acid or salts thereof, and the polysaccharide hybrid polymer composition. In these embodiments, the component concentration ranges provided above for the detergent are representative of the ranges of those same components in the composition.

In alternative embodiments, functional materials are added to provide desired properties and functionalities to the composition. For the purpose of this application, the term "functional materials" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional materials may be used. Moreover, the components discussed above may be multifunctional and may also provide several of the functional benefits discussed below.

Secondary Alkali Source

The composition can include one or more secondary alkali sources. Examples of suitable secondary alkali sources of the composition include, but are not limited to alkali metal carbonates, alkali metal hydroxides and alkali metal silicates. Exemplary alkali metal carbonates that can be used include, but are not limited to: sodium or potassium carbonate, bicarbonate, sesquicarbonate, and mixtures thereof. Exemplary alkali metal hydroxides that can be used include, but are not limited to: sodium or potassium hydroxide. The alkali metal hydroxide may be added to the composition in any form known in the art, including as solid beads, dissolved in an aqueous solution, or a combination thereof. Examples of alkali metal silicates include, but are not limited to sodium or potassium silicate or polysilicate, sodium or potassium metasilicate and hydrated sodium or potassium metasilicate or a combination thereof.

Surfactants

The composition may also include a surfactant. A variety of surfactants can be used in the composition, including, but not limited to: anionic, nonionic, cationic, and zwitterionic surfactants. Exemplary surfactants that can be used are commercially available from a number of sources. For a discussion of surfactants, see Kirk-Othmer, Encyclopedia of Chemical Technology, Third Edition, volume 8, pages 900-912. When the composition includes a surfactant as a cleaning agent, the cleaning agent is provided in an amount effective to provide a desired level of cleaning. The composition, when provided as a concentrate, can include the surfactant cleaning agent in a range of about 0.05% to about 20% by weight, about 0.5% to about 15% by weight, about 1% to about 15% by weight, about 1.5% to about 10% by weight, and about 2% to about 8% by weight. Additional exemplary ranges of surfactant in a concentrate include about 0.5% to about 8% by weight, and about 1% to about 5% by weight.

Examples of anionic surfactants useful in the composition include, but are not limited to: carboxylates such as alkylcarboxylates and polyalkoxycarboxylates, alcohol ethoxylate carboxylates, nonylphenol ethoxylate carboxylates; sulfonates such as alkylsulfonates, alkylbenzenesulfonates, alkylarylsulfonates, sulfonated fatty acid esters; sulfates such as sulfated alcohols, sulfated alcohol ethoxylates, sulfated alkylphenols, alkylsulfates, sulfosuccinates, and alkylether sulfates. Exemplary anionic surfactants include, but are not limited to: sodium alkylarylsulfonate, alpha-olefinsulfonate, and fatty alcohol sulfates.

Examples of nonionic surfactants useful in the composition include, but are not limited to, those having a polyalkylene oxide polymer as a portion of the surfactant molecule. Such nonionic surfactants include, but are not limited to: chlorine-, benzyl-, methyl-, ethyl-, (propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated amines such as alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ether; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block polymers. An example of a commercially available ethylene oxide/propylene oxide block polymer includes, but is not limited to, PLURONIC®, available from BASF Corporation, Florham Park, N.J. and BEROL® available from AkzoNobel Surface Chemistry, Chicago, Ill. An example of a commercially available silicone surfactant includes, but is not limited to, ABIL® B8852, available from Goldschmidt Chemical Corporation, Hopewell, Va. A particularly suitable surfactant is D500, an ethylene oxide/propylene oxide polymer available from BASF Corporation, Florham Park, N.J.

Examples of cationic surfactants that can be used in the composition include, but are not limited to: amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride. The cationic surfactant can be used to provide sanitizing properties.

Examples of zwitterionic surfactants that can be used in the composition include, but are not limited to: betaines, imidazolines, and propionates.

When the composition is intended to be used in an automatic dishwashing or warewashing machine, the surfactants selected, if any surfactant is used, can be those that provide an acceptable level of foaming when used inside a dishwashing or warewashing machine. Compositions for use in automatic dishwashing or warewashing machines are generally considered to be low-foaming compositions. Low foaming surfactants that provide the desired level of detersive activity are advantageous in an environment such as a dishwashing machine where the presence of large amounts of foaming can be problematic. In addition to selecting low foaming surfactants, defoaming agents can also be utilized to reduce the generation of foam. Accordingly, surfactants that are considered low foaming surfactants can be used. In addition, other surfactants can be used in conjunction with a defoaming agent to control the level of foaming.

Builders or Water Conditioners

The composition can include one or more building agents, also called chelating or sequestering agents (e.g., builders), including, but not limited to: condensed phosphates, alkali metal carbonates, phosphonates, aminocarboxylic acids, and/or polyacrylates. In general, a chelating agent is a molecule capable of coordinating (i.e., binding) the metal ions commonly found in natural water to prevent the metal ions from interfering with the action of the other detersive ingredients of a cleaning composition. Preferable levels of addition for builders that can also be chelating or sequestering agents are from about 0.1% to about 70% by weight, about 1% to about 60% by weight, or about 1.5% to about 50% by weight, based on the total weight of the composition. If the solid composition is provided as a concentrate, the concentrate can include from approximately 1% to approximately 60% by weight, from approximately 3% to approximately 50% by weight, and from approximately 6% to approximately 45% by weight of the builders, based on the total weight of the concentrate. Additional ranges of the builders include from approximately 3% to approximately 20% by weight, from approximately 6% to approximately 15% by weight, from approximately 25% to approximately 50% by weight, and from approximately 35% to approximately 45% by weight, based on the total weight of the composition.

Examples of condensed phosphates include, but are not limited to: sodium and potassium orthophosphate, sodium and potassium pyrophosphate, sodium tripolyphosphate, and sodium hexametaphosphate. A condensed phosphate may also assist, to a limited extent, in solidification of the composition by fixing the free water present in the composition as water of hydration.

Examples of phosphonates include, but are not limited to: 2-phosphonobutane-1,2,4-tricarboxylic acid (PBTC), 1-hydroxyetharte-1,1-diphosphonic acid, $CH_2C(OH)[PO(OH)_2]_2$; aminotri(methylenephosphonic acid), $N[CH_2PO(OH)_2]_3$; aminotri(methylenephosphonate), sodium salt (ATMP), $N[CH_2 PO(ONa)_2]_3$; 2-hydroxyethyliminobis(methytenephosphonic acid), $HOCH_2CH_2 N[CH_2 PO(OH)_2]_2$; diethylenetriaminepenta(methylenephosphonic acid), $(HO)_2POCH_2 N[CH_2 CH_2 N[CH_2 PO(OH)_2]_2]_2$; diethylenetriaminepenta(methylenephosphonate), sodium salt (DTPMP), $C_9 H_{(28-x)} N_3 Na_xO_{15} P_5$ (x=7); hexamethylenediamine(tetramethylenephosphonate), potassium salt, $C_{10}H_{(28-x)} N_2K_X O_{12} P_4$ (x=6); bis(hexamethylene)triamine (pentamethylenephosphonic acid), $(HO_2)POCH_2 N[(CH_2)_2N[CH_2 PO(OH)_2]_2]_2$; and phosphorus acid, $H_3PO_3$. A preferred phosphonate combination is ATMP and DTPMP. A neutralized or alkali phosphonate, or a combination of the phosphonate with an alkali source prior to being added into the mixture such that there is little or no heat or gas generated by a neutralization reaction when the phosphonate is added is preferred. In one embodiment, however, the composition is phosphorous-free.

Useful aminocarboxylic acid materials containing little or no NTA include, but are not limited to: N-hydroxyethylaminodiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), methylglycinediacetic acid (MGDA), glutamic acid-N,N-diacetic acid (GLDA), ethylenediaminesuccinic acid (EDDS), 2-hydroxyethyliminodiacetic acid (HEIDA), iminodisuccinic acid (IDS), 3-hydroxy-2-2'-iminodisuccinic acid (HIDS) and other similar acids or salts thereof having an amino group with a carboxylic acid substituent. In one embodiment, however, the composition is free of aminocarboxylates.

Water conditioning polymers can be used as non-phosphorus containing builders. Exemplary water conditioning polymers include, but are not limited to: polycarboxylates. Exemplary polycarboxylates that can be used as builders and/or water conditioning polymers include, but are not limited to: those having pendant carboxylate ($—CO_2^-$) groups such as polyacrylic acid, maleic acid, maleic/olefin polymer, sulfonated polymer or terpolymer, acrylic/maleic polymer, polymethacrylic acid, acrylic acid-methacrylic acid polymers, hydrolyzed polyacrylamide, hydrolyzed polymethacrylamide, hydrolyzed polyamide-methacrylamide polymers, hydrolyzed polyacrylonitrile, hydrolyzed polymethacrylonitrile, and hydrolyzed acrylonitrile-methacrylonitrile polymers. Other suitable water conditioning polymers include starch, sugar or polyols comprising carboxylic acid or ester functional groups. Exemplary carboxylic acids include but are not limited to maleic acid, acrylic, methacrylic and itaconic acid or salts thereof. Exemplary ester functional groups include aryl, cyclic, aromatic and $C_1$-$C_{10}$ linear, branched or substituted esters. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at substoichiometric levels to function as crystal modifiers Hardening Agents The compositions can also include a hardening agent in addition to, or in the form of, the builder. A hardening agent is a compound or system of compounds, organic or inorganic, which significantly contributes to the uniform solidification of the composition. Preferably, the hardening agents are compatible with the cleaning agent and other active ingredients of the composition and are capable of providing an effective amount of hardness and/or aqueous solubility to the processed composition. The hardening agents should also be capable of forming a homogeneous matrix with the cleaning agent and other ingredients when mixed and solidified to provide a uniform dissolution of the cleaning agent from the composition during use.

The amount of hardening agent included in the composition will vary according to factors including, but not limited to: the type of composition being prepared, the ingredients of the composition, the intended use of the composition, the quantity of dispensing solution applied to the solid composition over time during use, the temperature of the dispensing solution, the hardness of the dispensing solution, the physical size of the composition, the concentration of the other ingredients, and the concentration of the cleaning agent in the composition. It is preferred that the amount of the hardening agent included in the composition is effective to combine with the cleaning agent and other ingredients of the composition to form a homogeneous mixture under continuous mixing conditions and a temperature at or below the melting temperature of the hardening agent.

It is also preferred that the hardening agent form a matrix with the cleaning agent and other ingredients which will harden to a solid form under ambient temperatures of approximately 30° C. to approximately 50° C., particularly approximately 35° C. to approximately 45° C., after mixing ceases and the mixture is dispensed from the mixing system, within approximately 1 minute to approximately 3 hours, particularly approximately 2 minutes to approximately 2 hours, and particularly approximately 5 minutes to approximately 1 hour. A minimal amount of heat from an external source may be applied to the mixture to facilitate processing of the mixture. It is preferred that the amount of the hardening agent included in the composition is effective to provide a desired hardness and desired rate of controlled solubility of the processed composition when placed in an aqueous medium to achieve a desired rate of dispensing the cleaning agent from the solidified composition during use.

The hardening agent may be an organic or an inorganic hardening agent. A preferred organic hardening agent is a polyethylene glycol (PEG) compound. The solidification rate of compositions comprising a polyethylene glycol hardening agent will vary, at least in part, according to the amount and the molecular weight of the polyethylene glycol added to the composition. Examples of suitable polyethylene glycols include, but are not limited to: solid polyethylene glycols of the general formula $H(OCH_2CH_2)_nOH$, where n is greater than 15, particularly approximately 30 to approximately 1700. Typically, the polyethylene glycol is a solid in the form of a free-flowing powder or flakes, having a molecular weight of approximately 1,000 to approximately 100,000, particularly having a molecular weight of at least approximately 1,450 to approximately 20,000, more particularly from approximately 1,450 to approximately 8,000. The polyethylene glycol is present at a concentration of from approximately 1% to 75% by weight and particularly approximately 3% to approximately 15% by weight, based on the total weight of the composition. Suitable polyethylene glycol compounds include, but are not limited to: PEG 4000, PEG 1450, and PEG 8000 among others, with PEG 4000 and PEG 8000 being most preferred. An example of a commercially available solid polyethylene glycol includes, but is not limited to: CARBOWAX, available from Union Carbide Corporation, Houston, Tex.

Preferred inorganic hardening agents are hydratable inorganic salts, including, but not limited to: sulfates, carbonates and bicarbonates. The inorganic hardening agents are present at concentrations of up to approximately 50% by weight, from approximately 5% to approximately 50% by weight, particularly approximately 5% to approximately 25% by weight, and more particularly approximately 5% to approximately 15% by weight, based on total weight of the composition. In one embodiment, however, the solid composition is free of sulfates and carbonates including soda ash.

Urea particles can also be employed as hardeners in the compositions. The solidification rate of the compositions will vary, at least in part, to factors including, but not limited to: the amount, the particle size, and the shape of the urea added to the composition. For example, a particulate form of urea can be combined with a cleaning agent and other ingredients, and preferably a minor but effective amount of water. The amount and particle size of the urea is effective to combine with the cleaning agent and other ingredients to form a homogeneous mixture without the application of heat from an external source to melt the urea and other ingredients to a molten stage. It is preferred that the amount of urea included in the composition is effective to provide a desired hardness and desired rate of solubility of the composition when placed in an aqueous medium to achieve a desired rate of dispensing the cleaning agent from the solidified composition during use. In some embodiments, the composition includes from approximately 5% to approximately 90% by weight urea, particularly from approximately 8% to approximately 40% by weight urea, and more particularly from approximately 10% to approximately 30% by weight urea, based on total weight of the composition.

The urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is preferably milled to reduce the particle size to about 50 U.S. mesh to about 125 U.S. mesh, particularly about 75-100 U.S. mesh, preferably using a wet mill such as a single or twin-screw extruder, a Teledyne mixer, a Ross emulsifier, and the like.

Bleaching Agents

Bleaching agents suitable for use in the composition for lightening or whitening a substrate include bleaching compounds capable of liberating an active halogen species, such as $Cl_2$, $Br_2$, $—OCl^-$ and/or $—OBr^-$, under conditions typically encountered during the cleansing process. Suitable bleaching agents for use in the compositions include, but are not limited to: chlorine-containing compounds such as chlorine, hypochlorites, or chloramines. Exemplary halogen-releasing compounds include, but are not limited to: the alkali metal dichloroisocyanurates, chlorinated trisodium phosphate, the alkali metal hypochlorites, monochloramine, and dichloramine. Encapsulated chlorine sources may also be used to enhance the stability of the chlorine source in the composition (see, for example, U.S. Pat. Nos. 4,618,914 and 4,830,773, the disclosure of which is incorporated by reference herein). A bleaching agent may also be a peroxygen or active oxygen source such as hydrogen peroxide, perborates, sodium carbonate peroxyhydrate, potassium permonosulfate, and sodium perborate mono and tetrahydrate, with and without activators such as tetraacetylethylene diamine. When the concentrate includes a bleaching agent, it can be included in an amount from approximately 0.1% to approximately 60% by weight, from approximately 1% to approximately 20% by weight, from approximately 3% to approximately 8% by weight, and from approximately 3% to approximately 6% by weight, based on the total weight of the composition.

Fillers

The composition can include an effective amount of detergent fillers which do not perform as a cleaning agent per se, but cooperates with the cleaning agent to enhance the overall cleaning capacity of the composition. Examples of detergent fillers suitable for use in the present cleaning compositions include, but are not limited to: sodium sulfate and sodium chloride. When the concentrate includes a detergent filler, it can be included in an amount up to approximately 50% by weight, from approximately 1% to approximately 30% by weight, or from approximately 1.5% from approximately 25% by weight, based on total weight of the composition.

Defoaming Agents

A defoaming agent for reducing the stability of foam may also be included in the composition. Examples of defoaming agents include, but are not limited to: ethylene oxide/propylene block polymers such as those available under the name Pluronic® N-3 available from BASF Corporation, Florham Park, N.J.; silicone compounds such as silica dispersed in polydimethylsiloxane, polydimethylsiloxane, and functionalized polydimethylsiloxane such as those available under the name Abil® B9952 available from Goldschmidt Chemical Corporation, Hopewell, Va.; fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate. A discussion of defoaming agents may be found, for example, in U.S. Pat. No. 3,048,548 to Martin et al, U.S. Pat. No. 3,334,147 to Brunelle et al., and U.S. Pat. No. 3,442,242 to Rue et al., the disclosures of which are incorporated herein by reference. When the concentrate includes a defoaming agent, the defoaming agent can be provided in an amount from approximately 0.0001% to approximately 10% by weight, from approximately 0.001% to approximately 5% by weight, or from approximately 0.01% to approximately 1.0% by weight, based on total weight of the composition.

Anti-Redeposition Agents

The composition can include an anti-redeposition agent for facilitating sustained suspension of soils in a cleaning solution and preventing the removed soils from being redeposited onto the substrate being cleaned. Examples of suitable anti-redeposition agents include, but are not limited to: polyacrylates, styrene maleic anhydride polymers, cellulosic derivatives such as hydroxyethyl cellulose, hydroxypropyl cellulose and carboxymethyl cellulose. When the concentrate includes an anti-redeposition agent, the anti-redeposition agent can be included in an amount from approximately 0.5% to approximately 10% by weight, and from approximately 1% to approximately 5% by weight, based on total weight of the composition.

Stabilizing Agents

The composition may also include stabilizing agents. Examples of suitable stabilizing agents include, but are not limited to: borate, calcium/magnesium ions, propylene glycol, and mixtures thereof. The concentrate need not include a stabilizing agent, but when the concentrate includes a stabilizing agent, it can be included in an amount that provides the desired level of stability of the concentrate. Exemplary ranges of the stabilizing agent include up to approximately 20% by weight, from approximately 0.5% to approximately 20% by weight, from approximately 0.5% to approximately 15% by weight, and from approximately 2% to approximately 10% by weight, based on total weight of the composition.

Dispersants

The composition may also include dispersants. Examples of suitable dispersants that can be used in the composition include, but are not limited to: maleic acid/olefin polymers, polyacrylic acid, and mixtures thereof. The concentrate need not include a dispersant, but when a dispersant is included it can be included in an amount that provides the desired dispersant properties. Exemplary ranges of the dispersant in the concentrate can be up to approximately 20% by weight, from approximately 0.5% to approximately 20% by weight, from approximately 0.5% to approximately 15% by weight, and from approximately 2% to approximately 9% by weight based on the total weight of the composition.

Enzymes

Enzymes that can be included in the composition include those enzymes that aid in the removal of starch and/or protein stains. Exemplary types of enzymes include, but are not limited to: proteases, alpha-amylases, and mixtures thereof. Exemplary proteases that can be used include, but are not limited to: those derived from *Bacillus licheniformix, Bacillus lenus, Bacillus alcalophilus*, and *Bacillus amyloliquefacins*. Exemplary alpha-amylases include *Bacillus subtilis, Bacillus amyloliquefaceins* and *Bacillus licheniformis*. The concentrate need not include an enzyme, but when the concentrate includes an enzyme, it can be included in an amount that provides the desired enzymatic activity when the composition is provided as a use composition. Exemplary ranges of the enzyme in the concentrate include up to approximately 15% by weight, from approximately 0.5% to approximately 15% by weight, from approximately 0.5% to approximately 10% by weight, and from approximately 1% to approximately 5% by weight, based on total weight of the composition.

Fragrances and Dyes

Various dyes, odorants including perfumes, and other aesthetic enhancing agents can also be included in the composition. Suitable dyes that may be included to alter the appearance of the composition, include, but are not limited to: Direct Blue 86, available from Mac Dye-Chem Industries, Ahmedabad, India; Fastusol Blue, available from Mobay Chemical Corporation, Pittsburgh, Pa.; Acid Orange 7, available from American Cyanamid Company, Wayne, N.J.; Basic Violet 10 and Sandolan Blue/Acid Blue 182, available from Sandoz, Princeton, N.J.; Acid Yellow 23, available from Chemos GmbH, Regenstauf, Germany; Acid Yellow 17, available from Sigma Chemical, St. Louis, Mo.; Sap Green and Metanil Yellow, available from Keyston Analine and Chemical, Chicago, Ill.; Acid Blue 9, available from Emerald Hilton Davis, LLC, Cincinnati, Ohio; Hisol Fast Red and Fluorescein, available from Capitol Color and Chemical Company, Newark, N.J.; and Acid Green 25, Ciba Specialty Chemicals Corporation, Greenboro, N.C.

Fragrances or perfumes that may be included in the compositions include, but are not limited to: terpenoids such as citronellol, aldehydes such as amyl cinnamaldehyde, a jasmine such as C1S-jasmine or jasmal, and vanillin.

In an embodiment, these aesthetic enhancing agents can be included in the composition in an amount from about 0.1% to about 5%, based on total weight of the composition.

Thickeners

The compositions can include a rheology modifier or a thickener. The rheology modifier may provide the following functions: increasing the viscosity of the compositions; increasing the particle size of liquid use compositions when dispensed through a spray nozzle; providing the use compositions with vertical cling to surfaces; providing particle suspension within the use compositions; or reducing the evaporation rate of the use compositions.

The rheology modifier may provide a use composition that is pseudo plastic, in other words the use composition or material when left undisturbed (in a shear mode), retains a high viscosity. However, when sheared, the viscosity of the material is substantially but reversibly reduced. After the shear action is removed, the viscosity returns. These properties permit the application of the material through a spray head. When sprayed through a nozzle, the material undergoes shear as it is drawn up a feed tube into a spray head under the influence of pressure and is sheared by the action of a pump in a pump action sprayer. In either case, the viscosity can drop to a point such that substantial quantities of the material can be applied using the spray devices used to apply the material to a soiled surface. However, once the material comes to rest on a soiled surface, the materials can regain high viscosity to ensure that the material remains in place on the soil. Preferably, the material can be applied to a surface resulting in a substantial coating of the material that provides the cleaning components in sufficient concentration to result in lifting and removal of the hardened or baked-on soil. While in contact with the soil on vertical or inclined surfaces, the thickeners in conjunction with the other components of the cleaner minimize dripping, sagging, slumping or other movement of the material under the effects of gravity. The material should be formulated such that the viscosity of the material is adequate to maintain contact between substantial quantities of the film of the material with the soil for at least a minute, particularly five minutes or more.

Examples of suitable thickeners or rheology modifiers are polymeric thickeners including, but not limited to: polymers or natural polymers or gums derived from plant or animal sources. Such materials may be polysaccharides such as large polysaccharide molecules having substantial thickening capacity. Thickeners or rheology modifiers also include clays.

A substantially soluble polymeric thickener can be used to provide increased viscosity or increased conductivity to the use compositions. Examples of polymeric thickeners for the aqueous compositions of the invention include, but are not limited to: carboxylated vinyl polymers such as polyacrylic acids and sodium salts thereof, ethoxylated cellulose, polyacrylamide thickeners, cross-linked, xanthan compositions, sodium alginate and algin products, hydroxypropyl cellulose, hydroxyethyl cellulose, and other similar aqueous thickeners that have some substantial proportion of water solubility. Examples of suitable commercially available thickeners include, but are not limited to: Acusol, available from Rohm & Haas Company, Philadelphia, Pa.; ALCOGUM® available from AkzoNobel, Chicago, Ill. and Carbopol, available from B.F. Goodrich, Charlotte, N.C.

Examples of suitable polymeric thickeners include, but not limited to: polysaccharides. An example of a suitable commercially available polysaccharide includes, but is not limited to, Diutan, available from Kelco Division of Merck, San Diego, Calif. Thickeners for use in the compositions further include polyvinyl alcohol thickeners, such as, fully hydrolyzed (greater than 98.5 mol acetate replaced with the —OH function).

An example of a particularly suitable polysaccharide includes, but is not limited to, xanthans. Such xanthan polymers are preferred due to their high water solubility, and great thickening power. Xanthan is an extracellular polysaccharide of xanthomonas campestras. Xanthan may be made by fermentation based on corn sugar or other corn sweetener by-products. Xanthan comprises a poly beta-(1-4)-D-Glucopyranosyl backbone chain, similar to that found in cellulose. Aqueous dispersions of xanthan gum and its derivatives exhibit novel and remarkable rheological properties. Low concentrations of the gum have relatively high viscosities which permit it to be used economically. Xanthan gum solutions exhibit high pseudo plasticity, i.e. over a wide range of concentrations, rapid shear thinning occurs that is generally understood to be instantaneously reversible. Non-sheared materials have viscosities that appear to be independent of the pH and independent of temperature over wide ranges. Preferred xanthan materials include crosslinked xanthan materials. Xanthan polymers can be crosslinked with a variety of known covalent reacting crosslinking agents reactive with the hydroxyl functionality of large polysaccharide molecules and can also be crosslinked using divalent, trivalent or polyvalent metal ions. Such crosslinked xanthan gels are disclosed in U.S. Pat. No. 4,782,901, which is herein incorporated by reference. Suitable crosslinking agents for xanthan materials include, but are not limited to: metal cations such as $Al^{+3}$, $Fe^{+3}$, $Sb^{+3}$, $Zr^{+4}$ and other transition metals. Examples of suitable commercially available xanthans include, but are not limited to: KELTROL®, KELZAN® AR, KELZAN® D35, KELZAN® S, KELZAN® XZ, available from Kelso Division of Merck, San Diego, Calif. Known organic crosslinking agents can also be used. A preferred crosslinked xanthan is KELZAN® AR, which provides a pseudo plastic use composition that can produce large particle size mist or aerosol when sprayed.

In an embodiment, the rheology modifiers and thickeners may be included in the composition in an amount from about 0.1 to about 5.0 weight %, based on total weight of the composition.

Methods of Manufacture

In general, the composition of the present invention can be created by combining the 2-phosphonobutane-1,2,4-tricarboxylic acid, the polysaccharide hybrid polymer composition and any additional functional components and allowing the components to interact.

In one example, the alkali metal hydroxide, water, 2-phosphonobutane-1,2,4-tricarboxylic acid, the polysaccharide hybrid polymer composition and any additional functional components interact and harden into solid form. The solidification process may last from a few minutes to about six hours, depending on factors including, but not limited to: the size of the formed or cast composition, the ingredients of the composition, and the temperature of the composition.

The solid compositions may be formed using a batch or continuous mixing system. In an exemplary embodiment, a single- or twin-screw extruder is used to combine and mix one or more cleaning agents at high shear to form a homogeneous mixture. In some embodiments, the processing temperature is at or below the melting temperature of the components. The processed mixture may be dispensed from the mixer by forming, casting or other suitable means, whereupon the composition hardens to a solid form. The structure of the matrix may be characterized according to its hardness, melting point, material distribution, crystal structure, and other like properties according to known methods in the art. Generally, a solid composition processed according to the method of the invention is substantially homogeneous with regard to the distribution of ingredients throughout its mass and is dimensionally stable.

In an extrusion process, the liquid and solid components are introduced into final mixing system and are continuously mixed until the components form a substantially homogeneous semi-solid mixture in which the components are distributed throughout its mass. The mixture is then discharged from the mixing system into, or through, a die or other shaping means. The product is then packaged. In an exemplary embodiment, the formed composition begins to harden to a solid form in from approximately 1 minute to approximately 3 hours. Particularly, the formed composition begins to harden to a solid form from approximately 1 minute to approximately 2 hours. More particularly, the formed composition begins to harden to a solid form from approximately 1 minute to approximately 20 minutes.

In a casting process, the liquid and solid components are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in from approximately 1 minute to approximately 3 hours. Particularly, the cast composition begins to harden to a solid form in from approximately 1 minute to approximately 2 hours. More particularly, the cast composition begins to harden to a solid form approximately 1 minute to approximately 20 minutes.

By the term "solid", it is meant that the hardened composition will not flow and will substantially retain its shape under moderate stress or pressure or mere gravity. The degree of hardness of the solid cast composition may range from that of a fused solid product which is relatively dense and hard, for example, like concrete, to a consistency characterized as being a hardened paste. In addition, the term "solid" refers to the state of the composition under the expected conditions of storage and use of the solid composition. In general, it is expected that the composition will remain in solid form when exposed to temperatures of up to approximately 100° F. and particularly up to approximately 120° F.

The resulting solid composition may take forms including, but not limited to: a cast solid product; an extruded, molded or formed solid pellet, block, tablet, powder, granule, flake; or the formed solid can thereafter be ground or formed into a powder, granule, or flake. In an exemplary embodiment, extruded pellet materials formed by the solidification matrix have a weight of approximately 50 grams to approximately 250 grams, extruded solids formed by the composition have a weight of approximately 100 grams or greater, and solid block detergents formed by the composition have a mass of approximately 1 to approximately 10 kilograms. The solid compositions provide for a stabilized source of functional materials. In some embodiments, the solid composition may be dissolved, for example, in an aqueous or other medium, to create a concentrated and/or use composition. The solution may be directed to a storage reservoir for later use and/or dilution, or may be applied directly to a point of use.

In certain embodiments, the solid composition is provided in the form of a unit dose. A unit dose refers to a solid composition unit sized so that the entire unit is used during a single washing cycle. When the solid composition is provided as a unit dose, it is typically provided as a cast solid, an extruded pellet, or a tablet having a size of approximately 1 gram to approximately 50 grams.

In other embodiments, the solid composition is provided in the form of a multiple-use solid, such as a block or a plurality of pellets, and can be repeatedly used to generate aqueous compositions for multiple washing cycles. In certain embodiments, the solid composition is provided as a cast solid, an extruded block, or a tablet having a mass of approximately 5 grams to approximately 10 kilograms. In certain embodiments, a multiple-use form of the solid composition has a mass of approximately 1 kilogram to approximately 10 kilograms. In further embodiments, a multiple-use form of the solid composition has a mass of of approximately 5 kilograms to approximately 8 kilograms. In other embodiments, a multiple-use form of the solid composition has a mass of about approximately 5 grams to approximately 1 kilogram, or of approximately 5 grams to approximately 500 grams.

Although the composition is discussed as being formed into a solid product, the composition may also be provided in the form of a paste or liquid. When the concentrate is provided in the form of a paste, enough water is added to the composition such that complete solidification of the composition is precluded. In addition, dispersants and other components may be incorporated into the composition in order to maintain a desired distribution of components.

Methods of Use

The compositions can include concentrate compositions which may be added to an aqueous system or may be diluted to form use compositions. In general, a concentrate refers to a composition that is intended to be added to or diluted with water, and the composition that contacts articles to be washed can be referred to as the use composition.

A use composition may be prepared from the concentrate by diluting the concentrate with water at a dilution ratio that provides a use composition having desired detersive properties. The water that is used to dilute the concentrate to form the use composition can be referred to as water of dilution or a dilutent, and can vary from one location to another. The use composition can also include additional functional ingredients at a level suitable for cleaning, rinsing, or the like.

The concentrate compositions may essentially include only the polysaccharide polymer and PBTC, and additional components and/or functional materials may be added as separate ingredients prior to the point of use or at the point of use. Alternatively, the concentrate compositions may include the polysaccharide polymer and PBTC as well as additional components such as, but not limited to, at least one alkali metal hydroxide.

The typical dilution factor is from approximately 1 to approximately 10,000 but will depend on factors including water hardness, the amount of soil to be removed and the like. In one embodiment, the concentrate is diluted at a ratio of about 1:10 to about 1:1000 concentrate to water. Particularly, the concentrate is diluted at a ratio of about 1:100 to about 1:5000 concentrate to water. More particularly, the concentrate is diluted at a ratio of about 1:250 to about 1:2000 concentrate to water.

A suitable concentration range of the components includes of about 1 to about 500 parts-per-million (ppm) of the polysaccharide hybrid polymer composition and of about 0.1 to about 200 ppm of PBTC. A particularly suitable concentration range of the components includes from about 5 to about 500 parts-per-million (ppm) of the polysaccharide hybrid polymer composition and from about 0.5 to about 200 ppm of PBTC. Another particularly suitable concentration range of the components includes from about 10 to about 100 ppm of the polysaccharide hybrid polymer composition and from about 1 and about 150 ppm PBTC.

When an alkali metal hydroxide is present, a suitable concentration range of the components in the use composition includes about 1 to about 1000 ppm alkali metal hydroxide, from about 0.1 to about 200 ppm PBTC, and from about 1 to about 500 ppm of the polysaccharide hybrid polymer composition. A particularly suitable concentration range of the components in the use composition includes from about 50 and about 1000 ppm alkali metal hydroxide, from about 0.5 to about 200 ppm PBTC, and from about 5 to 500 ppm of the polysaccharide hybrid polymer composition. Another particularly suitable concentration range of the components in the use composition includes from about 200 to about 800 ppm alkali metal hydroxide, from about 1 to about 150 ppm of PBTC, and from about 10 to about 100 ppm of the polysaccharide hybrid polymer composition.

The composition can contain an effective concentration of the alkali metal hydroxide so that use composition has a pH of at least about 9. In one embodiment, the composition is a use composition that can be brought into contact to clean articles or substrates, such as glass, plastic, ceramic, and metal, and the polysaccharide hybrid polymer composition and PBTC may function to prevent or remove re-deposition of protein on the substrate.

EXAMPLES

The present invention is more particularly described in the following examples that are intended as illustrations only, since numerous modifications and variations within the scope of the present invention will be apparent to those of skill in the art. Unless otherwise noted, all parts, percentages, and ratios reported in the following examples are on a weight bases, and all reagents used in the examples were obtained, or are available, from the chemical suppliers described below, or may be synthesized by conventional techniques.

Materials Used

Lime-A-Way: a hard water stain remover that eliminates lime, calcium and rust stains and is available from Reckitt Benckiser Ecolab, Inc., St. Paul, Minn.

Guardian Plus®: a warewashing detergent available from Ecolab, Inc., St. Paul, Minn.

Pluronic® N-3: a ethylene oxide/propylene oxide block polymer surfactant available from BASF Corporation.

Bayhibit® S: 2-phosphobutane-1,2,4-tricarboxylic acid tetrasodium salt available from Lanxess, Pittsburgh, Pa.

EXP 1: a polysaccharide hybrid polymer composition containing about 50% by weight polysaccharide residue and about 50% by weight acrylic acid residue.

Solid Power XL®: a solid detergent containing sodium hydroxide available from Ecolab, St. Paul, Minn.

Synthesis of EXP 1

A 2 liter reactor containing 538 grams of water and 280 grams of DE 10 maltodextrin was heated to 95° C. A monomer solution consisting of 280 grams of acrylic acid and 107 grams of water was added to the reactor over 2.5 hours. An initiator solution comprising of 37.3 grams of sodium persulfate in 118 grams of water was simultaneously added to the reactor over a period of 2.5 hours. The reaction product was held at 95° C. for an additional period of 1 hour. The polymer solution was partially neutralized by using 140.4 grams of 50% sodium hydroxide and then 0.2 grams of Proxel GXL was added as a biocide. The resulting polysaccharide hybrid polymer composition contained about 50% by weight polysaccharide residue and about 50% by weight acrylic acid residue.

Cleaning Libby Glasses

Six 10 oz. Libby glasses were prepared for laboratory warewashing procedures by removing all film and foreign material from the glass surface. A three-gallon stainless steel pail was filled with distilled water and placed on a hot plate set on high. The pail was covered with aluminum foil and brought to boil.

While the water in the pail was brought to a boil, the Libby glasses were placed on a glass rack and loaded in a Hobart AM-15 warewash machine. The warewash machine had a washbath volume of 60 L, a rinse volume of 4.5 L, a wash time of 50 seconds and a rinse time of 9 seconds. The warewash machine was filled with hot soft water (130° F. minimum) and 20 grams of Lime-A-Way, the door was closed and the automatic cycle was run.

When the cycle was complete, the warewash machine was drained, refilled with hot soft water and 20 grams of Guardian Plus, and the automatic cycle was run. When the cycle was complete, the warewash machine was drained, refilled with hot soft water and 10 grams of sodium tripolyphosphate, and the automatic cycle was run again.

After completion of the automatic cycle with polyphosphate, the machine was drained and refilled with the boiling distilled water from the pail. The control panel was switched to a delime setting and the machine was allowed to run with the distilled water for three minutes. After three minutes, the glasses were removed and the tops of the glasses were mopped with a clean, dry towel. The glasses were allowed to dry in the glass rack. The rack may be elevated on one side to facilitate draining and drying.

100 Cycle Warewashing Test

To determine the ability of various detergent compositions to remove spots and film from ware, six Libby 10 oz. glass tumblers were prepared by removing all film and foreign material from the surfaces of the glasses as described above. A Hobart AM-15 warewash machine was then filled with an appropriate amount of water and the water was tested for hardness. After recording the hardness value, the tank heaters were turned on. On the day of the experiments, the water hardness was 17 grains (1 grain=17 parts-per-million). The warewash machine was turned on and wash/rinse cycles were run through the machine until a wash temperature of between about 150° F. and about 160° F. and a rinse temperature of between about 175° F. and about 190° F. were reached. The controller was then set to dispense an appropriate amount of detergent into the wash tank. The detergent was dispensed such that when the detergent was mixed with water during the cycle to form a use solution, the detergent concentration in the use solution is specified in Table 1. The solution in the wash tank was titrated to verify detergent concentration. The warewash machine had a washbath volume of 53 liters, a rinse volume of 2.8 liters, a washtime of 50 seconds, and a rinse time of 9 seconds.

The six clean glass tumblers were placed diagonally in a Rabum rack and one Newport 10 oz. plastic tumbler was placed off-diagonally in the Rabum rack (see FIG. 1 for arrangement) and the rack was placed inside the warewash machine. (P=plastic tumbler; G=glass tumbler).

The 100 cycle test was then started. At the beginning of each wash cycle, the appropriate amount of detergent was automatically dispensed into the warewash machine to maintain the initial detergent concentration. The detergent concentration was controlled by conductivity.

Upon completion of 100 cycles, the rack was removed from the warewash machine and the glass and plastic tumblers were allowed to dry. The glass and plastic tumblers were then graded for spot and film accumulation using an analytical light box evaluation. The light box test used a digital camera, a light box, a light source, a light meter and a control computer employing "Spot Advance" and "Image Pro Plus" commercial software. A glass to be evaluated was placed on its side on the light box, and the intensity of the light source was adjusted to a predetermined value using the light meter. A photographic image of the glass was taken and saved to the computer. The software was then used to analyze the upper half of the glass, and the computer displayed a histogram graph with the area under the graph being proportional to the thickness of the film.

Generally, a lower light box score indicates that more light was able to pass through the tumbler. Thus, the lower the light box score, the more effective the composition was at preventing scale on the surface of the tumbler.

Samples 1-4 and Comparative Samples A and B

Samples 1-4 included varying concentrations of Bayhihit S (phosphonate) and EXP 1 (polysaccharide hybrid polymer composition). The active water conditioner package (active we package) was the same for each Sample. Comparison Sample A was a Solid Power XL available from Ecolab Inc., St, Paul. Comparison Sample B was similar to the Samples 1-4 but did not include Bayhibit or EXP 1. The component concentrations of the detergent compositions of Samples 1-4 and Comparative Example B are presented below in Table 1.

TABLE 1

|  | SMP 1 | SMP 2 | SMP 3 | SMP 4 | Comp. SMP B |
|---|---|---|---|---|---|
| Sodium hydroxide | 67.09 | 67.09 | 67.09 | 67.09 | 79.1 |
| Water | 16.07 | 23.92 | 18.73 | 21.33 | 18.9 |
| Pluronic N3 | 1.71 | 1.71 | 1.71 | 1.71 | 2 |
| EXP 1, 40.9% | 15.13 | 0 | 10 | 5 | 0 |
| Bayhibit S, 85% | 0 | 7.28 | 2.47 | 4.87 | 0 |
| Total | 100 | 100 | 100 | 100 | 100 |
| Active wc package | 6.19 | 6.19 | 6.19 | 6.18 | 0 |
| Use concentration (ppm) | 750 | 750 | 750 | 750 | 636 |

Table 2 presents the total light box score for the glass tumblers, plastic tumblers, and all tumblers (SUM(glass), SUM(plastic), SUM(total), respectively). The average glass tumbler light box score is also provided (Average(glass)).

TABLE 2

|  | SUM(glass) | SUM(plastic) | SUM(total) | Average (glass) |
|---|---|---|---|---|
| SMP 1 | 348135 | 28111 | 376246 | 58023 |
| SMP 2 | 202015 | 22680 | 224695 | 33669 |
| SMP 3 | 152432 | 18756 | 171188 | 25405 |
| SMP 4 | 154080 | 21004 | 175084 | 25680 |
| Comp SMP A | 147284 | 30191 | 177475 | 24547 |
| Comp SMP B | 393210 | 65535 | 458745 | 65535 |

The polysaccharide hybrid polymer composition and PBTC combination improved the light box scores compared to Comparative Samples B which did not include the polysaccharide hybrid polymer composition and PBTC. A percentage difference is calculated by dividing the difference of two values by the average of two values. The percentage differences of the total light box score after 100 cycles using a polysaccharide hybrid polymer composition and PBTC compared to Comparative Sample B (which did not include a polysaccharide hybrid polymer composition and PBTC) were 91% for Sample 3, 90% for Sample 4, 103% for Sample 5, and 107% for Sample 7.

The polysaccharide hybrid polymer composition and PBTC combination also showed improvements over the use of the polysaccharide hybrid polymer composition alone. For polysaccharide hybrid polymer composition EXP 1, the percentage difference of the total light box score after 100 cycles of Sample 3 compared to Sample 1 was 68% and the difference between Sample 4 and Sample 1 was 75%.

Further, as shown in Table 2, Samples 3 and 4, which included Bayhibit S and polysaccharide hybrid polymer composition, were as effective as or more effective than the solid detergent containing sodium hydroxide of Comparative Sample A in removing and/or preventing hard water scale.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A cleaning composition comprising:
   at least one alkali metal hydroxide;
   water;
   2-phosphonobutane-1,2,4-tricarboxylic acid or salts thereof; and
   a polysaccharide hybrid polymer composition comprising:
      polysaccharide residue in an amount from approximately 5% to approximately 90% by weight of the polysaccharide hybrid polymer composition; and
      residue of at least one ethylenically unsaturated monomer present in an amount from approximately 10% to approximately 75% by weight of the polysaccharide hybrid polymer composition.

2. The cleaning composition of claim 1 wherein the at least one ethylenically unsaturated monomer includes at least one anionic ethylenically unsaturated monomer.

3. The cleaning composition of claim 1, wherein the at least one ethylenically unsaturated monomer includes at least one member selected from the group consisting of acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, 2-acryloxypropionic acid, and salts and combinations thereof.

4. The cleaning composition of claim 3, wherein the at least one ethylenically unsaturated monomer includes at least one member selected from the group consisting of acrylic acid, maleic acid, methacrylic acid, 2-acrylamido-2-methyl propane sulfonic acid, monomethyl maleate, and salts and combinations thereof.

5. The cleaning composition of claim 1, wherein the at least one alkali metal hydroxide includes sodium hydroxide, potassium hydroxide, lithium hydroxide or combinations thereof.

6. The cleaning composition of claim 1, wherein the polysaccharide hybrid polymer composition has a weight average molecular weight from approximately 2,000 g/mol to approximately 25,000 g/mol.

7. The cleaning composition of claim 1, wherein the polysaccharide hybrid polymer composition is present in an amount from about 0.1% to about 15% by weight of the cleaning composition.

8. The cleaning composition of claim 7, wherein 2-phosphonobutane-1,2,4-tricarboxylic acid or salts thereof are present in an amount from about 0.01% to about 10% by weight of the cleaning composition.

9. The cleaning composition of claim 8, wherein the alkali metal hydroxide is present in an amount from about 1% to about 80% by weight of the cleaning composition.

10. The cleaning composition of claim 1, wherein the 2-phosphonobutane-1,2,4-tricarboxylic acid or salts thereof and the polysaccharide hybrid polymer composition are present in a combined amount from approximately 0.5% to approximately 25% by weight of the cleaning composition.

11. The cleaning composition of claim 1, wherein the cleaning composition contains about 10% or more biodegradable content by weight.

12. A method of preparing a use solution, the method comprising:
   mixing water with a detergent composition to form the use solution, wherein the use solution comprises:

at least one alkali metal hydroxide present in an amount from about 1 ppm to about 1000 ppm;

2-phosphonobutane-1,2,4-tricarboxylic acid or salts thereof present in an amount from about 0.1 ppm to about 200 ppm; and a polysaccharide hybrid polymer composition present in an amount from about 1 ppm to about 500 ppm, wherein the polysaccharide hybrid polymer composition comprises from about 5% to about 90% by weight polysaccharide residue and from about 10% to about 75% by weight residue of at least one ethylenically unsaturated monomer.

13. The method of claim 12, wherein the at least one ethylenically unsaturated monomer includes at least one anionic unsaturated monomer.

14. The method of claim 12, wherein the least one ethylenically unsaturated monomer includes at least one member selected from the group consisting of acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, 2-acryloxypropionic acid, 2-acrylamido-2-methyl propane sulfonic acid, vinyl sulfonic acid, sodium methallyl sulfonate, sulfonated styrene, allyloxybenzene sulfonic acid and monomethyl maleate, and salts and combinations thereof.

15. The method of claim 14, wherein the at least one ethylenically unsaturated monomer includes at least one member selected from the group consisting of acrylic acid, maleic acid, methacrylic acid, 2-acrylamido-2-methyl propane sulfonic acid, monomethyl maleate, and salts and combinations thereof.

16. The method of claim 12, wherein the at least one alkali metal hydroxide includes sodium hydroxide, potassium hydroxide, lithium hydroxide or combinations thereof.

17. The method of claim 12, where the polymer composition has a weight average molecular weight from about 2,000 g/mol to about 25,000 g/mol.

18. A method for controlling hard water scale, the method comprising:
adding an anionic polysaccharide hybrid polymer composition and 2-phosphonobutane-1,2,4-tricarboxylic acid or salts thereof to an aqueous system to control hard water scaling, wherein the polysaccharide hybrid polymer composition comprises:
residue of a polysaccharide present in an amount from about 5% to about 90% the polysaccharide hybrid polymer composition; and
residue of at least one ethylenically unsaturated monomer present in amount from about 10% to about 75% weight of the polysaccharide hybrid polymer composition; and
wherein the polysaccharide hybrid polymer composition and 2-phosphonobutane-1,2,4-tricarboxylic acid or salts thereof are added in amounts such that the aqueous system includes about 1 to about 500 ppm polysaccharide hybrid polymer composition and from about 0.1 to about 200 ppm 2-phosphonobutane-1,2,4-tricarboxylic acid or salts thereof.

19. The method of claim 18, and further comprising:
adding at least one alkali metal hydroxide to the aqueous system to form a use solution.

20. The method of claim 18, wherein the polysaccharide hybrid polymer composition and the 2-phosphonobutane-1,2,4-tricarboxylic acid or salts thereof are present in a weight ratio from about 15:1 to about 1:15.

21. The method of claim 18, wherein the at least one ethylenically unsaturated monomer is anionic.

22. The method of claim 18, wherein the at least one ethylenically unsaturated monomer includes at least one member selected from the group consisting of acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, 2-acryloxypropionic acid, 2-acrylamido-2-methyl propane sulfonic acid, vinyl sulfonic acid, sodium methallyl sulfonate, sulfonated styrene, allyloxybenzene sulfonic acid and monomethyl maleate, and salts and combinations thereof.

23. The method of claim 22, wherein the at least one ethylenically unsaturated monomer includes at least one member selected from the group consisting of acrylic acid, maleic acid, methacrylic acid, 2-acrylamido-2-methyl propane sulfonic acid, monomethyl maleate, and salts and combinations thereof.

* * * * *